United States Patent [19]

Kuze

[11] 4,196,344
[45] Apr. 1, 1980

[54] MACHINE CONTROLLER

[76] Inventor: Yoshikazu Kuze, 31-3, Higashi Magome 1-Chome, Ota-Ku, Tokyo, Japan

[21] Appl. No.: 863,847

[22] Filed: Dec. 23, 1977

[30] Foreign Application Priority Data

Dec. 27, 1976 [JP] Japan ............................ 51-156317
Nov. 28, 1977 [JP] Japan ............................ 52-141602

[51] Int. Cl.² .......................................... G06M 3/02
[52] U.S. Cl. ......................... 235/92 CT; 235/92 PE
[58] Field of Search ......... 235/92 PE, 92 QC, 92 CT, 235/92 FP; 328/48

[56] References Cited

U.S. PATENT DOCUMENTS

| | | | |
|---|---|---|---|
| 3,660,972 | 5/1972 | Neill et al. ..................... | 235/92 QC |
| 3,750,603 | 8/1973 | Martin ........................... | 235/92 PE |
| 3,824,378 | 7/1974 | Johnson ......................... | 235/92 PE |
| 3,952,944 | 4/1976 | Koyanagi et al. .............. | 235/92 QC |
| 4,005,409 | 1/1977 | Feuer ............................. | 235/92 FP |
| 4,019,029 | 4/1977 | Pozzetti ......................... | 235/92 PE |
| 4,064,501 | 12/1977 | Yost et al. ..................... | 235/92 FP |

*Primary Examiner*—Joseph M. Thesz
*Attorney, Agent, or Firm*—James E. Nilles

[57] ABSTRACT

A machine controller to be adapted to pressing and other machines for detecting an emergency and stopping a machine. Said machine controller, comprising, a circuit for detecting an emergency and stopping a machine, a counter circuit, a first preset circuit, a second preset circuit, and a controlling circuit of an outer sequencer. A timing pulse generated once per cycle of said machine is counted and displayed. Said machine is stopped when said count coincides with a numeral predetermined by a first preset code switch. A signal is conducted to an outer sequencer when said count has reached a numeral of an inspection lot predetermined by a second preset code switch, thereby said outer sequencer is actuated.

12 Claims, 6 Drawing Figures

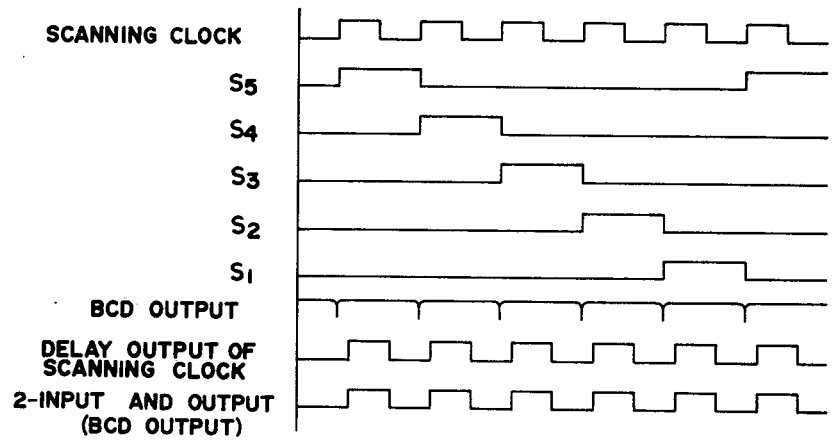
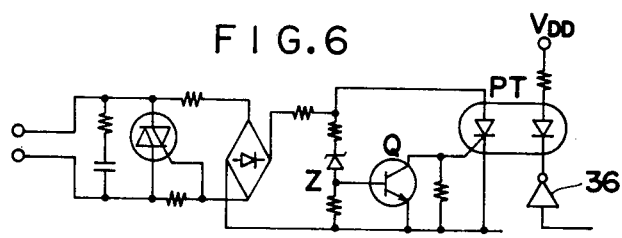
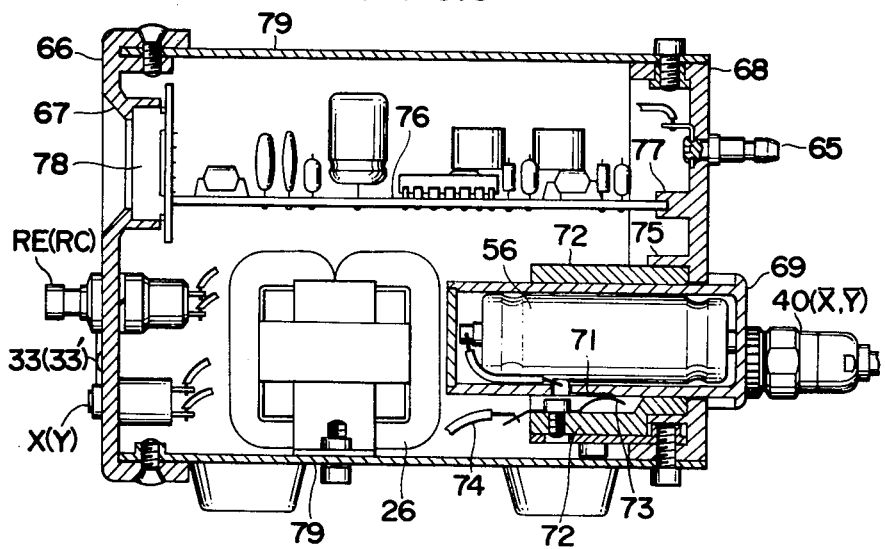

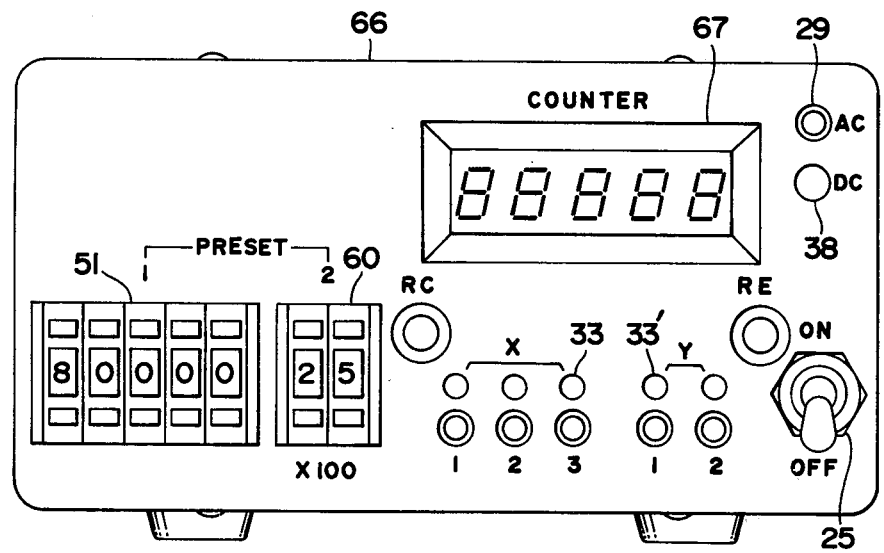
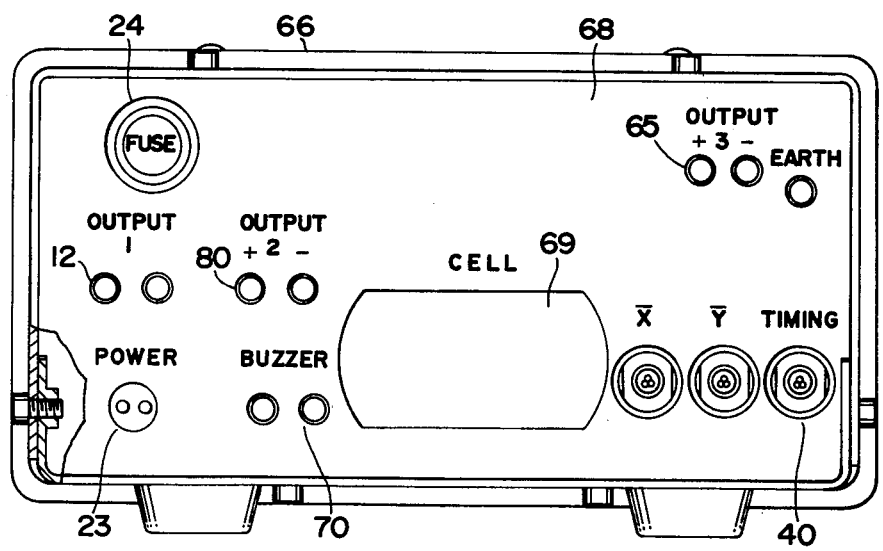

MACHINE CONTROLLER

This invention relates to a machine controller to be adapted to pressing and other machines for detecting an emergency and stopping a machine, and more particularly it relates to a machine controller which contains preset counters.

In addition to detect an emergency and stop a machine, the machine controller of this invention counts and displays a number of timing pulses emitted once per cycle of the machine and stops the machine when the displayed number coincides with a predetermined number of a first preset code switch, that is to say, the production of the predetermined number has been accomplished. Also, by a second preset code switch which predetermines a number of an inspection lot, said machine controller generates an output and thereby actuates an outer sequencer everytime when the count reaches the number of said inspection lot.

When said outer sequencer actuates, various sequence controls can be achieved. For example, a container loaded with products will be replaced by an empty container or the last product of the inspection lot will be removed to a designated place and, if necessary, it will be inspected automatically, hence, unmanned operations can be accomplished.

The object of the present invention is not only detecting an emergency, stopping a machine and thereby preventing unexpected losses but also to stop the machine when the production reaches a predetermined number by the first preset code switch and to actuate the outer sequencer everytime when the count reaches a predetermined number of the inspection lot, thus, to accomplish unmanned operations.

The other object of this invention is to present a reliable machine controller of this kind in a compact size, at an economical cost and equipped with many capabilities including a non-contact load control circuit.

These and additional objects as well as features of this invention will become readily evident from the following description when considered in conjunction with explanations of accompanying drawings, in which;

FIG. 2 is a chart of pulse wave form;

FIG. 3 is a front view of said machine controller of this invention;

FIG. 4 is a back view of said machine controller;

FIG. 5 is a cross-sectional view of the same; and

FIG. 6 is a circuit diagram in explanation of another embodiment of a load control circuit.

Figure 1:
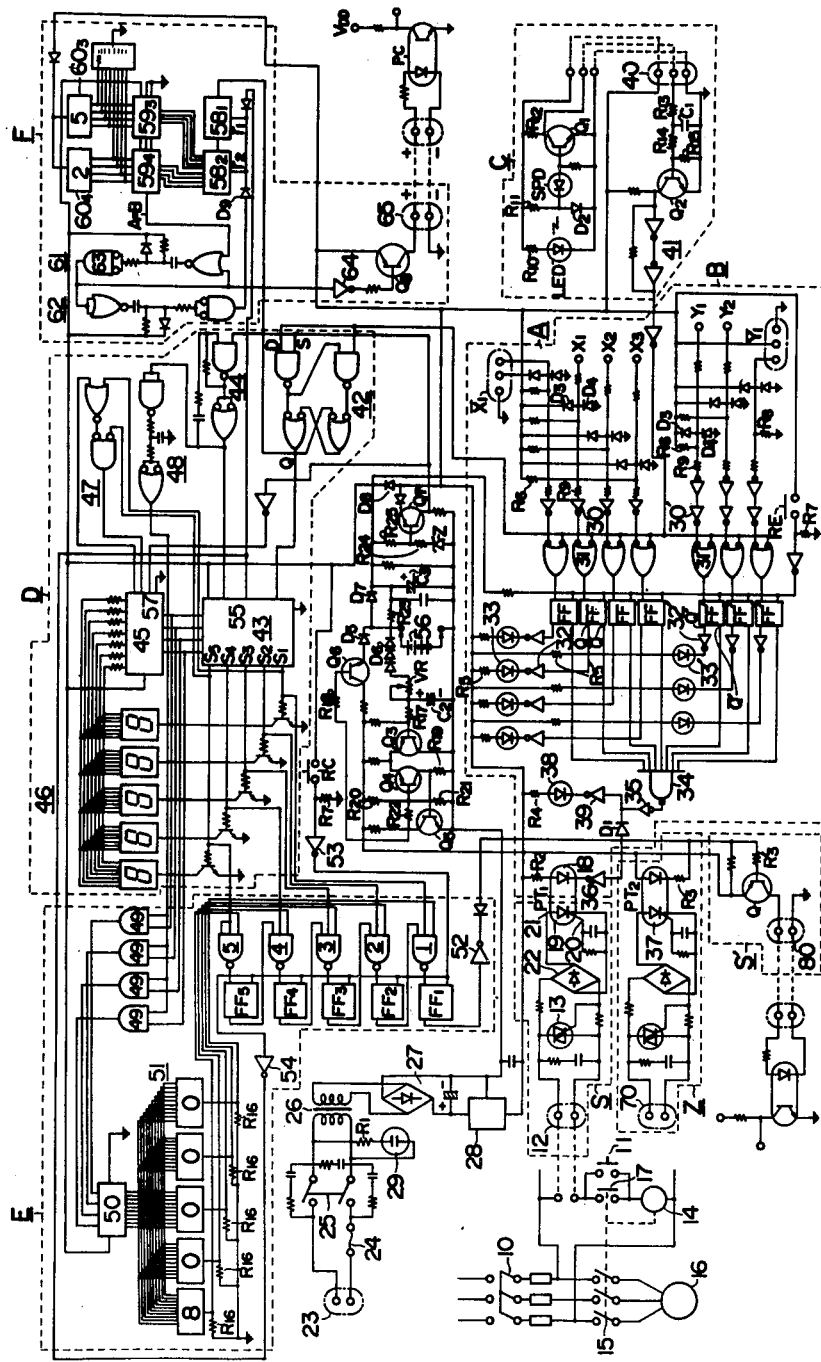
FIG. 1 is a circuit diagram of a machine controller of this invention.

An embodiment of this invention will now be explained according to the circuit diagram of FIG. 1. When a knife switch 10 is closed and a starting switch 11 is pushed, the anode and the cathode of a triac 13 located in a stopping circuit S, as mentioned hereafter, turns to its ON state through a connector 12. Then the current flows in an electromagnetic coil 14 of an electromagnetic contactor, closing a main contact 15 of the electromagnetic contactor, thus starting a motor 16 and the machine starts its operation.

In the instant the current flows in the said electromagnetic coil 14, an auxiliary contact 17 of the electromagnetic contactor which is connected in parallel with said starting switch 11 closes so that the current is fed into the electromagnetic coil 14 through said auxiliary contact 17 and said motor 16 continues to drive even after said starting switch 11 is released.

In said stopping circuit S, terminals of the input and the output thereof are electrically insulated by a photo thyristor $PT_1$. A gate 20 of a thyristor 19 is triggered by the output signal of a light emitting diode 18 in said photo thyristor $PT_1$. A bridge 22 is connected to an anode 21 of said thyristor 19 so that the positive voltage is always applied to the anode 21 and said triac 13 is triggered through said bridge 22.

Said light emitting diode 18 is its ON state unless emergency detecting ciucuits A and B, as mentioned hereafter, detect an emergency and is put into its OFF state whenever said circuits detect an emergency. Consequently, the machine continues to operate when no emergency exists and it stops to operate whenever an emergency occurs.

A DC source is obtained through a transformer 26, a rectifier circuit 27 and a fixed-voltage regulator 28. When a switch 25 is turned ON, an alternating current indicator 29 lights. The direct current source is applied to emergency detecting circuits, a timing pulse generating circuit, a preset code switch circuit, a counter circuit and a charging circuit etc., as mentioned hereafter.

All the emergency phenomena come from two conditions of either "exist though it should'nt" or "does'nt exist though is should". These two conditions are converted to electrical signals of a "H" level and a "L" level by sensors and said signals are applied to detecting terminals of said emergency detecting circuits.

Therefore, if four circuits namely, the timing pulse generating circuit which feeds a pulse to emergency detecting circuits at any instant, the circuit A which generates an output when an input turns from "H" level to "L" level, the circuit B which generates an output when an input turns from "L" level to "H" level and the stopping circuit S, are combined and connected, any emergency can be detected and the motor as well as the machine can be stopped.

Emergency detecting circuits A and B will now be explained.

In the circuit A, sensors connected to detecting terminals $X_1$, $X_2$ and $X_3$ merely turn ON and OFF and do not generate a voltage and a current. A sensor connected to a detecting terminal $\overline{X}_1$ like a photo sensor, a lead switch and the like, generates a voltage and a current. All the detecting terminals of the circuit A are kept at "H" level under the normal condition but turn to "L" level at the instant sensors connected thereto detect an emergency.

In the circuit B, sensors connected to detecting terminals $Y_1$ and $Y_2$ merely turn ON and OFF and do not generate a voltage and a current. A sensor connected to a detecting terminal $\overline{Y}_1$ like a photo sensor, a lead switch and the like, generates a voltage and a current. All the detecting terminals of the circuit B are kept at "L" level under the normal condition but turn to "H" level at the instant sensors connected thereto detect an emergency.

In the circuit A, emergency detecting circuits connected to terminals $X_1$, $X_2$, $X_3$ and $\overline{X}_1$ are in a similar, independent circuit formation so that the only circuit $X_1$ will now be explained.

Under the normal condition of the circuit $X_1$, an output of an inverter 30 is at "L" level and is applied to one input of a 2-input NAND gate 31. The other input of said NAND gate 31 is connected to an output of a timing pulse generating circuit C, as mentioned hereafter. During the period an output of said inverter 30 stays at "L" level, an output of said NAND gate 31 is held at "H" level regardless the output of said timing pulse generating circuit is at either "H" level or "L" level. Consequently, an output Q of a flip-flop FF is at "L" level and an output of an inverter 32 is at "H" level, therefore a light emitting diode 33 does not light.

In the circuit B, emergency detecting circuits connected terminals $Y_1$, $Y_2$, $Y_3$ and $\overline{Y}_1$ are in a similar, independent circuit formation so that the only circuit $Y_1$ will now be explained.

Under the normal condition of the circuit $Y_1$, an output of an inverter 30' is at "L" level and is applied to one input of a 2-input NAND gate 31'. The other input of the NAND gate 31' is connected to an output of said timing pulse generating circuit C. During the period an output of said inverter 30' stays at "L" level, an output of said NAND gate 31' is held at "H" level regardless the output of said timing pulse generating circuit is at either "H" level or "L" level. Consequently, an output Q' of a flip-flop FF' is at "L" level and an output of an inverter 32' is at "H" level, therefore a light emitting diode 33' does not light.

On the other hand, outputs $\overline{Q}$ and $\overline{Q}'$ of a group of flip-flop FF and FF' located in circuits A and B are applied to a multi-input NAND gate 34 and outputs thereof are connected to said DC source through an inverter 35, a diode $D_1$ having a polarity shown in the drawing, an inverter 36, said light emitting diode 18 and a resistor $R_2$.

An anode of said diode $D_1$ is connected said DC source through a resistor $R_3$, a light emitting diode 37 of a photo thyristor $PT_2$ located in a buzzer circuit Z.

Also, an anode of a light emitting diode 38 for indicating the DC source is connected to the DC source through a resistor $R_4$ and a cathode thereof is connected to said diode $D_1$ as well as said inverter 35 through an inverter 39.

An anode of said diode $D_1$ is connected to the base of a PNP transistor Q located in a stopping circuit S through a resistor $R'_3$.

A timing pulse generating circuit C will now be explained. This circuit generates one pulse per cycle of the machine and a lead switch, a photo sensor and the like are adopted. In case of the lead switch, a small piece of magnetic material is fixed at a portion of the machine which turns once per cycle of the machine. In case the photo sensor is used, on the other hand, a small piece of material is fixed at aforesaid portion of the machine. A circuit C in FIG. 1 is showing a case the photo sensor is adopted.

Series circuits consisting of a light emitting diode LED and resistor $R_{10}$ and $R_{11}$ and a diode $D_2$ are connected between the DC source and the ground respectively, while an intermediate point connecting said resistor $R_{11}$ and said diode $D_2$ is connected to a cathode of a silicon photo diode SPD. An anode of said SPD is connected to the base of a transistor $Q_1$ and a collector of said transistor $Q_1$ is connected to the DC source through a resistor $R_{12}$ while an emitter thereof is connected to the ground. At the same time, said collector is connected to said 2-input NAND gates 31 and 31' through an integration circuit consisting of a resistor $R_{13}$ and a capacitor $C_1$, and further through gate protecting resistor $R_{14}$ and $R_{15}$, a transistor $Q_2$, a Schmidt trigger circuit 14 and an inverter.

During the period said light emitting diode LED is projecting a light onto said silicon photo diode SPD, a total of a forward voltage of the diode $D_2$ and a photoelectric voltage of the silicon photo diode SPD exceeds $V_{BE}$ of the transistor $Q_1$ so that $Q_1$ is its ON state and a collector voltage thereof is at "L" level.

When the small piece of light shielding material intercepts the light of the light emitting diode LED, the photoelectric voltage of the silicon photo diode SPD disappears, putting $Q_1$ into its OFF state and the collector voltage thereof becomes "H" level, generating a timing pulse.

Since circuit formation of emergency detecting circuits A, B and the pulse generating circuit C are as such as mentioned above, an output of said inverter 36 is at "L" level unless sensors connected to detecing terminals of circuit A and B detect an emergency, regardless an output of the pulse generating circuit is at either "H" level or "L" level. Accordingly, a current is continuously fed into the light emitting diode 18 of said photo thyristor $PT_1$ and, therefore, the machine remains in operation. At this time, the DC indicating LED 38 is energized, and a group of emergency indicating LED 33 and 33' remain deenergized.

However, in case any one of detecting terminals of circuits A and B detects an emergency, and an output of the pulse generating circuit becomes "H" level, an output of the multi-input NAND gate 34 turns to "H" level, letting an output of said inverter 36 turn to "H" level and the current of the primary side of said photo thyristor $PT_1$ is intercepted.

Hence, the machine stops its operation and the DC indicating LED 38 is deenergized. At this condition, an emergency indicating LED 33, 33' are energized. By which it can be judged which sensor connected to detecting terminals has detected an emergency.

Here, the place of the abnormal portion is inspected and repaired. After the repairing, a reset switch RE is pushed, letting the emergency indicating LED 33, 33' are deenergized, the DC indicating LED 38 energized and everything returns to the normal condition.

Although explanation of the buzzer circuit Z are omitted since it is similar to the stopping circuit S, the primary side of the photo thyrister $PT_1$ in the stopping circuit S is connected to the diode $D_1$ through the inverter 36, while the same in the buzzer circuit Z is directly connected to the diode $D_1$. Accordingly, when the stopping circuit S is ON state, the buzzer circuit Z is OFF state and the converse is also true. In other words, the buzzer does not buzz when the machine is in operation and it buzzes when the machine stops.

Resistors $R_1$, $R_2$, $R_3$, $R_4$ and $R_5$ are current limiting resistors, $R_6$ is a pull-up resistor, $R_7$, $R_8$ are pull-down resistors and diodes $D_3$, $D_4$ and resistor $R_9$ are used for gate protection. The number of detecting terminals in circuits A and B is increased or decreased as required.

A counter circuit D will be explained next. The circuit diagram of FIG. 1 shows one embodiment in which a segment display indicating five figures namely, maximum 99999 is adopted. A pulse in the timing pulse generating circuit C is utilized as the counter pulse. The timing pulse is applied to a D terminal of a latch circuit 42. An output Q of the latch circuit 42 is applied to decade counter 43.

The decade counter 43 needs a scanning clock pulse in order to indicate the dynamic. It is given by a astable multivibrator circuit 44.

BCD outputs of the decade counter 43 are applied to a BCD-to-seven segment decoder 45, outputs of which are connected to anodes of each segment of a segment display 46. Digit outputs $S_1$, $S_2$, $S_3$, $S_4$, and $S_5$ of the decade counter 43 are connected to cathodes of each segment of said segment display 46 through transistors.

47 is a leading zero blanking circuit and is used to put out unnecessary "O" displays.

A first preset counter circuit E will now be explained. Digit pulses synchronized with scanning clock pulses appear on digit output terminals $S_1$, $S_2$, $S_3$, $S_4$ and $S_5$. The digit pulse and the BCD pulse are turned at the same time by the scanning clock pulse but strictly speaking, either one proceeds than the other.

So, the scanning clock pulse of the astable multivibrator 44 is applied to a delay circuit 48, the output of which is applied to 2-input AND gates 49 together with BCD outputs. Then, as shown in FIG. 2, the pulse width of the BCD output is made about one half of the digit pulse width and, at the same time, the BCD output is so arranged that it generates at about center of the digit pulse width.

Now, output of the 2-input AND gate 49 is applied to a decimal decoder 50, being converted there to decimal numerals which are applied respectively to a first preset code switch 51 that has five figures. The output pulse of the said switch 51 and the digit pulse are applied respectively to the corresponding figure of the said NAND gate where the timing is matched. In the example in FIG. 1, the first preset code switch 51 has five figures and is showing that the numeral of 80000 is preset.

The timing is matched from the fifth figure toward the first figure, that is to say, the output pulse of the fifth figure of the digit pulse is applied first to a NAND 5 and then the pulse of fifth figure of the preset code switch is applied there, where a timing is matched. When both outputs turn to "H" level, the output of NAND 5 is memorized by the flip-flop $FF_5$, the output of which is applied to the fourth figure of the NAND 4 where it waits for a timing. The digit pulse of the fourth figure and the pulse of the preset code switch of the fourth figure are then applied to NAND 4 and three inputs together turn to "H" level. The output of NAND 4 is memorized by the $FF_4$, and the output of which is applied to the third figure of NAND 3 next. In such a way as described above, an output of an inverter 52 turns to "L" level when the output of the last $FF_1$ becomes "H" level.

Now, the output of the inverter 36 in emergency detecting circuits becomes "H", the light emitting diode 18 of the photo thyristor $PT_1$ is turned OFF, the triac 13 of the stopping circuit S is also put to its OFF state and the machine stops. At this time, the buzzer circuit Z turns ON and the buzzer connected to the said circuit sounds an alarm.

In FIG. 1, the preset numeral of the preset code switch 51 is 80000 so that the machine stops at the instant the segment display 46 indicates 80000.

When a reset switch RC is pushed, a master reset 55 of the decade counter 43 becomes "H" level through inverters 53 and 54 and the counter circuits are all cleared. $R_{16}$ is a gate protecting resistor.

A battery charging circuit will be explained next. The voltage of a Ni-Cd DC source 56 is set up by a resistor $R_{17}$ and a VR. When the voltage of the DC source drops, a PNP transistor $Q_3$ turns ON and a transistor $Q_4$ which is forming a differential amplifier in pair with the $Q_3$, turns OFF. When said $Q_4$ turns OFF, a transistor $Q_5$ also turns OFF, the collector voltage of said $Q_5$ rises nearly to the power source voltage and it applies the base current to a transistor $Q_6$ through a resistor $R_{18}$.

Said $Q_6$ then turns ON and applies the charging current to said DC source 56 through a diode $D_5$ which has a polarity shown in the drawing.

When the charging progresses, the base voltage of said $Q_3$ increases and the $Q_3$ turns OFF. When said $Q_3$ turns OFF, said $Q_4$ turns ON and by the voltage drop of a resistor $R_{19}$, said $Q_5$ turns ON, said $Q_6$ turns OFF and the charging current stops.

$R_{20}$ and $R_{21}$ divide the power source voltage and set up the base voltage of said $Q_4$ equal to the same of said $Q_3$. Resistor $R_{22}$ determines a hysteresis width of the base voltage of said $Q_4$. A group of diode $D_6$ compensate the negative temperature characteristic of the battery and a capacitor $C_2$ restrains the oscillation.

A switching circuit of the battery source will now be explained. The plus (+) side of the battery 56 is connected to the DC source through a parallel circuit of a diode $D_7$ and a resistor $R_{23}$ and further through a diode $D_8$ having a polarity shown in the drawing.

A series circuit of a resistor $R_{24}$ and a zenor diode Z is connected to the DC source through a resistor $R_{25}$, meanwhile a intermediate point between said resistor $R_{24}$ and $R_{25}$ is connected to the base of PNP transistor $Q_7$. The emitter of said $Q_7$ is connected to the power source and the collector thereof is connected to the ground through a resistor. Said collector is also connected to a terminals of said latch circuit 42, said astable multivibrator 44, and through an inverter, a blanking terminal 57 of the segment decoder 45.

A timing pulse is fed into the latch circuit 42 as long as the input S thereto holds at "H" level.

When said input S turns to "L" level, the timing pulse is not fed therein and said output Q memorizes and keeps the former input AND said blanking terminal 57 energizes said segment display 46 as long as an input thereto keeps at "L" level, and deenergizes said display 46 when said input turns to "H" level.

The voltage of battery is arranged to be lower than the DC source voltage. Accordingly, while the power source is in a normal condition, the battery source is in the reverse bias so that it does not flow.

When the power source is in a normal condition, the current flows through said resistors $R_{25}$, $R_{24}$ and said zenor diode Z, hence, said $Q_7$ is ON state and the input S of said latch circuit 42 is "H" level, at the same time, the timing pulse is conducted and said astable multivibrator 44 oscillates. In the meantime, the blanking terminal 57 is "L" level and the segment display is being energized.

When the DC source is interrupted, the battery source is fed to the counter circuit. When the DC source is interrupted and as soon as the voltage thereof, on its way to zero, drops below the voltage of $V_{BE}+Z$ of said transistor $Q_7$, said $Q_7$ turns OFF.

Therefore, the input S of the latch circuit 42 turns to "L" level and memorizes and keeps the former input. Also, the astable multivibrator 44 stops the oscillation. On the other hand, since said blanking terminal 57 of the decoder driver turns to "H" level, the segment display 46 is deenergized. During the DC power source is interrupted, the current is intercepted by diodes $D_5$ and $D_8$ and is limited to be applied only to a memory circuit in said counter circuit. The pull-down resistor $R_7$ of said reset switch RE, RC prevent the DC current to be grounded while said switches are ON state.

The second preset counter circuit F will now be explained. The output pulse of the latch circuit 42 is fed to a BCD up counter $58_1$. Said counter consists of two identical, independent, 4 stage counters. Each counter can be cleared by applying a "H" level on the reset line. A similar counter $58_2$ connected to said counter $58_1$, counts third and fourth figures.

From the practical stand point, the counter $58_1$ is limited to count only and the BCD output of the third figure of said counter $58_2$ is connected to a code switch $60_3$ through a 4 bit comparator $59_3$ and the BCD output of the fourth figure of said counter $58_2$ is connected to a code switch $60_4$ through a 4 bit comparator $59_4$. Accordingly, the preset code switch indicating 25 as shown in the drawing means actually the presetting numerals of 2500.

The output A=B of the comparator $59_4$ is applied to a first monostable multivibrator circuit 61 which widens the pulse width and output of said circuit 61 is applied to a second monostable multivibrator circuit 62 which narrows the pulse width. The output of a NAND gate 63 which is the final stage of said circuit 61 is connected to the base of a PNP transistor $Q_8$ through an inverter 64.

The collector of said transistor $Q_8$ is connected to the plus (+) side of a connector 65 and the emitter thereof is connected to the power source. A photo coupler P.C of the outer sequencer is connected to the plus (+) side and the minus (−) side of said connector 65 as shown in the drawing. The output of said second monostable multivibrator 62 is connected to reset terminals $r_1$ and $r_2$ of said up counters $58_1$ and $58_2$ through a diode $D_9$ having a polarity shown in the drawing.

As long as the BCD output of the up counter and the corresponding output of the second code switch do not coincide, the output of the comparator $59_4$ is at "L" level and the output of said NAND gate 63 which is the final stage of the first monostable multivibrator 61 is "L" level, while the output of the inverter 64 is "H" level and the transistor $Q_8$ is its OFF state. In case of the embodiment shown in FIG. 1, the output of the comparator $59_4$ becomes "H" level as soon as the up counter has counted 2500, that is to say, it has coincided with the numeral 25 preset by said code switches. Accordingly, the transistor $Q_8$ turns to its ON state and actuates the outer sequencer through the connector 65. At the same time, by the output of said multivibrator 62, a "H" pulse of the narrow width is applied to reset terminals $r_1$ and $r_2$ of up counters $58_1$ and $58_2$ so that $58_1$ and $58_2$ are cleared, returning to zero and thus starts to count from one again on the next timing pulse.

FIG. 3 is a front view of the machine controller of this invention in which 66 is a panel, 25 is the power source switch, 67 is a counter indicator, 29 is the alternating current indicator, 38 is the direct current indicator, RE is the reset switch of emergency detecting circuits, RC is the reset switch of the counter circuit, $X_1$, $X_2$, $X_3$ are input terminals of the circuit A, 33 are corresponding emergency indicating LED, $Y_1$, $Y_2$ are input terminals of the circuit B, 33' are corresponding emergency indicating LED, 51 are first preset code switches and 60 are second preset code switches.

FIG. 4 is the back view of said machine controller of this invention in which 68 is equal, 23 is a AC input power code, 24 is a fuse, 69 is a battery cassette, 12 and 80 are output terminals, 70 are terminals for a buzzer, 65 are sequencer controlling terminals, 40 is a connector to the clock pulse generating circuit and terminals X and Y are emergency detecting terminals.

FIG. 5 is a cross-sectional view of said machine controller of this invention. 69 is a cassette to contain a battery 56 inside thereof and 71 is a electro conduct piece which is bonded outside said cassette and is connected to a pole of the battery. 72 is a shell is which said battery cassette is inserted slidably and a contactor 73 is fixed thereon which contacts with corresponding electro conduct piece 71. Two pairs of these electro conduct pieces and contactors face each other leaving spaces inbetween and both poles of the battery are led by lead wires 74.

68 is the block panel molded in one piece out of synthetic resin on which a guide 75 to embed and secure said shell 72 and a guide 77 to insert a printed circuit board 76 therein, are formed. Also, a connector can be formed thereon by fixing terminals 65 and the other.

66 is the front panel molded in one piece out of synthetic resin on which a guide frame to insert a display segment 78 therein and another guide to insert a printed circuit board therein, are arranged. Both panels are combined in one piece by heat sink plates 79. 26 is the transformer.

FIG. 6 is another embodiment of the stopping circuit. This circuit is a switching circuit to control an alternating current load and consists of the following three circuits; A zero cross circuit having a switching function in which an input and an output are isolated by a photo thyristor P.T and an output signal of a photo diode is utilized as a gate input of a thyristor, also SCR is triggered at around the zero volt level by means of detecting a phase by a transistor Q and a zenor diode Z; a bridge circuit; a triac circuit which controls the load. This stopping circuit is reliable as a non-contact switch because a surge voltage is restrained.

What is claimed is:

1. A machine controller for use with a machine and an outer sequencer which cooperates with said machine, comprising, a stopping circuit actuatable for stopping said machine;

an emergency detecting circuit for detecting an emergency and actuating said stopping circuit to stop said machine;

a circuit whereby a timing pulse is generated once per cycle of said machine;

a first preset circuit for receiving said timing pulses, counting the pulses and displaying the count on a segment display and whereby said stopping circuit is actuated and said machine is stopped when said count coincides with a numeral predetermined by a first preset code switch in said first preset circuit;

a second preset circuit for receiving said timing pulses and whereby a signal is provided to said outer sequencer when a count of the timing pulses has reached a numeral predetermined by a second preset code switch in said second preset circuit whereby said outer sequencer is actuated; and a controlling circuit for effecting operation of said outer sequencer.

2. A machine controller according to claim 1, wherein said first preset circuit further comprises a decade counter, a multivibrator, a delay circuit, a decoder driver, a decimal decoder, and AND gates, said first preset circuit being operated so that said timing pulse is applied to said decade counter which is utilized as a dynamic counter, the BCD outputs of which are applied to said segment display through said decoder driver, both BCD outputs and delayed scanning output from said multivibrator and said delay circuit are applied to said AND gates, an output of which is applied to said first preset code switch through said decimal decoder, whereby when all the outputs of said first preset code switch and corresponding digit outputs have coincided an outer motor driving circuit connected to said stopping circuit is turned OFF.

3. A machine controller according to claim 2, further including 3-input NAND gates and a flip-flop circuit and wherein said first circuit has a coincident stop circuit so operated that a coincident output of a digit output of said decade counter, said preset code switch output and the output of said flip-flop of the previous stage are applied to said 3-input NAND gates of a succeeding stage, whereby when all inputs of said 3-input NAND gates reach a certain level said stopping circuit is actuated.

4. A machine controller according to claim 1, wherein said second preset circuit further comprises up counters, a latch circuit, a comparator, and first and second monostable multivibrators, said second preset circuit being operated so that said timing pulse is applied to said up counters of said second preset circuit through said latch circuit, both the up counter outputs and said second preset code switch outputs being applied to said comparator and a coincident output of said latter two outputs being applied to said first monostable multivibrator, obtaining thereby a pulse of a broad width, by which said controlling circuit of said outer sequencer is actuated, said coincident output also being applied to said second monostable multivibrator, obtaining thereby a pulse of a narrow width by which said up counters are cleared.

5. A machine controller according to claim 1, wherein said emergency detecting circuit for detecting an emergency and said stopping circuit for stopping said machine comprise:
 a first circuit comprising multi-input NAND gates; flip-flop circuits; light emitting diodes; an isolator; and a group of similar independent circuits for detecting an emergency and in which a signal of the detecting terminals is kept at one level and is applied to a direct current source through said multi-input NAND gates, said flip-flop circuits and said light emitting diodes for indicating an emergency;
 a second circuit comprising a group of similar independent circuits for detecting an emergency and in which a signal of the detecting terminals is kept at another level and is applied to said direct current source through said multi-input NAND gates, said flip-flop circuits and said light emitting diodes for indicating an emergency; wherein the outputs of each of said flip-flop circuits are applied to said multi-input NAND gates, the outputs of which are connected to said direct current source through a primary side of said isolator, a secondary side of which isolator is connected to said stopping circuit for controlling said machine, and wherein, said timing pulse is also applied to said multi-input NAND gates of said first and second circuits respectively.

6. A machine controller according to claim 1, further comprising an electric battery for energizing said controller; a charging circuit for said battery; a DC voltage source; a pair of PNP transistors both having an equal base voltage and forming a differential amplifier which is connected to the (+) side of said battery; a first resistor between said amplifier and battery which regulates said voltage source; a first PNP transistor whose base is connected to the collector of a second transistor which actuates in response to said first PNP transistor through a second resistor which regulates a differential base voltage width, and a third transistor which turns a charging current ON and OFF and which is controlled by said second transistor.

7. A machine controller according to claim 1, wherein said first preset circuit includes a decoder, a decoder driver, a latch circuit and an astable multivibrator, and further comprising an electric battery for energizing said controller; a DC voltage source; a charging circuit; a latch circuit; a decoder driver and a battery switching circuit for said battery, wherein a plus (+) side of said battery is connected to said DC voltage source through a parallel circuit consisting of a first resistance and a first diode and further through a second diode and is also connected to said charging circuit through a third diode;
 wherein a series circuit comprising a first resistance and zener diode is connected to said DC voltage source through a second resistance, wherein an intermediate point connecting said second resistance and a third resistance is connected to the base of a PNP transistor; wherein the emitter of said transistor is connected to said power source and the collector of said transistor is connected to ground through a resistor; wherein said collector is further connected to said latch circuit, to a blanking terminal of said decoder driver and to said astable multivibrator.

8. A machine controller according to claim 1, including at least one printing circuit board whereon at least some of said circuits are mounted; a battery for energizing said controller; a battery container for said battery; connector terminals;
 a front panel molded in one piece with guide portions in which said segment display and said printed circuit board are inserted and secured;
 a back panel molded in one piece with guide portions in which said printed circuit board and said battery container are inserted and secured, said back panel including a connector plate portion on which a plurality of said connector terminals are directly fixed; and heat sink plates connected to and between said front panel and said back panel to support said panels and define a space wherein said printed circuit board, said battery container and said segment display are mounted.

9. A machine controller according to claim 8, wherein said battery container comprises a shell mounted on said back panel, resilient contactors fixed on said shell, a battery containing cassette slidably insertable in said shell, and contact means on said cassette in contact with both poles of a battery within said shell which engage said resilient contactors.

10. A machine controller as claimed in claim 1 wherein said stopping circuit comprises
 a photo thyristor for insulating the circuit input and output,
 a rectifying bridge circuit, and
 a triac circuit triggered through said rectifying bridge circuit for controlling said machine.

11. A machine controller according to claim 1, wherein said controlling circuit for said outer sequencer has a starting circuit comprising
 a photoresponsive isolator which is controlled by an output of said second preset circuit.

12. A machine controller according to claim 11, further comprising
 a zero cross circuit for effecting switching while resisting surge voltages.

* * * * *